United States Patent
Gropplero Di Troppenburg et al.

(10) Patent No.: US 10,265,659 B2
(45) Date of Patent: Apr. 23, 2019

(54) PROCESS FOR MANUFACTURING A FLUIDIC ELEMENT AND FLUIDIC ELEMENT MANUFACTURED USING SAID PROCESS

(71) Applicant: Commissariat a l'energie atomique et aux energies alternatives, Paris (FR)

(72) Inventors: Giacomo Gropplero Di Troppenburg, Grenoble (FR); Laurent Davoust, Gieres (FR); Yves Fouillet, Voreppe (FR); Frederic Revol-Cavalier, Seyssins (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 63 days.

(21) Appl. No.: 15/429,472

(22) Filed: Feb. 10, 2017

(65) Prior Publication Data
US 2017/0232399 A1    Aug. 17, 2017

(30) Foreign Application Priority Data

Feb. 11, 2016  (FR) ...................... 16 51116

(51) Int. Cl.
*B01L 3/00* (2006.01)
*F16K 7/04* (2006.01)
(Continued)

(52) U.S. Cl.
CPC .......... *B01D 69/02* (2013.01); *B01D 65/003* (2013.01); *B01D 67/0002* (2013.01); *B01L 3/50273* (2013.01); *B01L 3/502707* (2013.01); *B01L 3/502753* (2013.01); *F04B 45/08* (2013.01); *F16K 7/04* (2013.01); *B01L 3/5023* (2013.01); *B01L 3/502746* (2013.01); *B01L 2200/0689* (2013.01); *B01L 2200/12* (2013.01); *B01L 2300/069* (2013.01); *B01L 2300/0681* (2013.01); *B01L 2300/12* (2013.01);
(Continued)

(58) Field of Classification Search
None
See application file for complete search history.

(56) References Cited

U.S. PATENT DOCUMENTS

2012/0238008 A1    9/2012  Henry et al.
2014/0306371 A1*  10/2014  Guenther ............... C12M 23/16
                                                  264/177.18
(Continued)

OTHER PUBLICATIONS

French Preliminary Search Report (with Written Opinion) dated Nov. 4, 2016 in French Application 16 51116 filed on Feb. 11, 2016 (with English Translation).

*Primary Examiner* — Krishnan S Menon
(74) *Attorney, Agent, or Firm* — Oblon, McClelland, Maier & Neustadt, L.L.P.

(57) ABSTRACT

A process for manufacturing a fluidic element, which consists in forming at least one fluid-permeable zone and one fluid-impermeable zone in a three-dimensional cellular material, by addition of at least one second material having a liquid initial state. The process will for example include soaking of the cellular material by the second material present in the liquid initial state, evacuating the second material present in its liquid initial state from at least one zone of the cellular material, in order to render the permeable zone.

12 Claims, 4 Drawing Sheets

(51) Int. Cl.
  B01D 65/00 (2006.01)
  B01D 67/00 (2006.01)
  B01D 69/02 (2006.01)
  F04B 45/08 (2006.01)
(52) U.S. Cl.
  CPC ... *B01L 2300/123* (2013.01); *B01L 2300/126* (2013.01); *B01L 2400/0406* (2013.01); *B01L 2400/0481* (2013.01); *B01L 2400/086* (2013.01)

(56) References Cited

U.S. PATENT DOCUMENTS

2015/0079668 A1  3/2015  Kobayashi
2015/0367342 A1  12/2015  Zhou et al.

* cited by examiner

PROCESS FOR MANUFACTURING A FLUIDIC ELEMENT AND FLUIDIC ELEMENT MANUFACTURED USING SAID PROCESS

TECHNICAL FIELD OF THE INVENTION

The present invention relates to a process for manufacturing a fluidic element and to the fluidic element manufactured using said process.

PRIOR ART

A fluidic element is understood to mean an element that has one or more zones which are permeable so as to let through a fluid, such as a liquid or gas, and zones that are impermeable to this fluid. This type of element will in particular be useful in the lab-on-chip field. Certain fluidic elements are thus already known and various manufacturing processes have been described in the prior art. However, it turns out that the fluidic elements obtained are often fragile, and difficult and expensive to manufacture. This is the case for the fluidic elements manufactured according to the processes described in the following articles:

- Three-Dimensional Wax Patterning of Paper Fluidic Devices-Christophe Renault, Jessica Koehne, Antonio J. Ricco, and Richard M. Crooks.
- Ultra-rapid prototyping of flexible, multi-layered microfluidic devices via razor writing-Cosson S. et al.
- Method for fabrication of microfluidic systems in glass-Stjemström M. et al.

Furthermore, solutions are known from documents US 2015/367342 A1 and US 2015/079668 A1 in which a porous material such as paper is impregnated with a second preheated material such as wax or ink in order to create non-hydrophobic porous zones and hydrophobic zones in the structure of the paper. However, these solutions necessitate having recourse to heating means to ensure the melting of the material that is added and the fluidic element obtained remains limited in its field of application.

The objective of the invention is to propose a process for manufacturing a fluidic element that is simple, reliable and inexpensive and that makes it possible to manufacture a fluidic element in particular having features of flexibility and deformability, enabling it to be used in many applications. According to one aspect of the invention, the process of the invention will not necessarily require the use of heating means.

SUMMARY OF THE INVENTION

This objective is achieved by a process for manufacturing a fluidic element, which consists in forming at least one fluid-permeable zone and one fluid-impermeable zone in a three-dimensional cellular material that has a degree of elastic deformability in compression and in extension of between 10% and 500% relative to an initial shape, by the addition of at least one second material having a liquid initial state.

According to one particular embodiment variant, the process comprises the following steps:
- soaking of the cellular material by the second material present in the liquid initial state,
- evacuating the second material present in its liquid initial state from at least one zone of the cellular material, in order to render said zone permeable.

According to one distinctive feature, the evacuating step is carried out by compression of the soaked cellular material in said zone.

According to one distinctive feature, the soaking step is carried out by compression in order to make the second material penetrate into the cellular material.

According to one distinctive feature, the process comprises a step of creating at least one pattern in said soaked cellular material.

According to another embodiment variant, the process comprises the following steps:
- creating at least one cavity in the cellular material,
- inserting the second material in said cavity in order to form an impermeable zone by solidification of the second material.

According to one embodiment variant, said second material is a polymer, for example an elastomer, or a polymer material based on silicone.

According to one distinctive feature of the process, the cellular material used comprises open cells.

According to another distinctive feature of the process of the invention, the cellular material chosen is for example a polyurethane foam or a silicone foam.

According to another distinctive feature, the process could comprise a step of sealing at least one portion of the surface of the cellular material, by application of a membrane impermeable to the liquid on said portion of the surface of the cellular material.

The invention also relates to a fluidic element that comprises at least one fluid-impermeable zone and at least one fluid-permeable zone, which are obtained by means of the process as defined above.

The invention also relates to the use of this fluidic element in an application of filtration of a fluid through its permeable zone.

The invention also relates to the use of a fluidic element as defined above, in an application of control of the flow of a fluid by compression/decompression of its permeable zone.

BRIEF DESCRIPTION OF THE FIGURES

Other features and advantages will appear in the detailed description that follows, given with respect to the appended drawings in which.

In the appended figures, the various steps described may be illustrated by top views (denoted VD), by side views (denoted VC) or cross-sectional views (VCO).

DETAILED DESCRIPTION OF AT LEAST ONE EMBODIMENT

Figure 1:
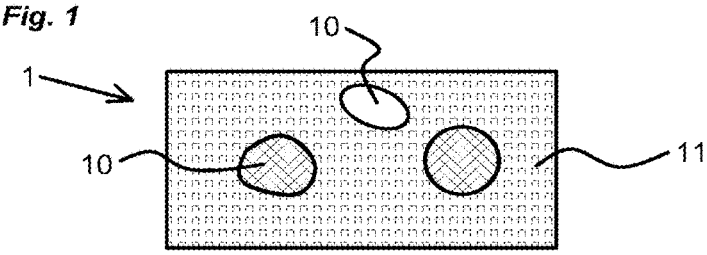
FIG. 1 represents a fluidic element in accordance with the invention.

The invention aims to produce a fluidic element 1 intended to transport at least one fluid, such as a liquid or a gas, that is to say an element that has at least one permeable zone 10 to let through the fluid and at least one zone 11 that is impermeable to this fluid. The permeable zones 10 created thus define fluidic pathways, the geometry of which may be controlled. The pathways will for example be deformable in order, for example, to pump or filter a fluid. FIG. 1 represents a fluidic element in accordance with the invention. The permeable zones may be empty, partially empty, or formed of basic cellular material that will be defined below.

The shape and the dimensions of each permeable zone and of each impermeable zone will be able to be controlled by the manufacturing process used.

In a fluidic element, several permeable zones may be isolated from one another or communicate with one another through one or more connecting fluidic pathways.

A three-dimensional cellular material is understood to mean a material that comprises several cells organized in one or more superposed layers or randomly in three dimensions.

The process of the invention is carried out using a cellular material. This cellular material could be:
- a closed-cell or closed-porosity material, thus having closed cells,
- an open-cell or open-porosity material, the cells of which are open to the neighbouring cells and to the outside.

The process of the invention applies more particularly to a cellular material that comprises at least one portion with open cells, natively present in the material or obtained by opening, for example by a chemical or thermal attack, closed cells of the cellular material.

The cellular material used will advantageously be deformable. A deformable material is understood to mean a material that can be deformed elastically and that has a degree of elastic deformability, in compression or extension, of between 10% and 500% relative to its initial shape, preferably of between 50% and 200% relative to its initial shape.

The deformable-type cellular materials will be for example:
- a polyurethane type foam,
- a silicone type foam,
- a PVC type foam,
- a polystyrene type foam,
- a polyimide type foam,
- a deformable metal foam, or
- a mixture of several foams, so as to create a material having a heterogeneous deformability, for example by adding a solid foam of metal or graphite type to a deformable foam with the meaning defined above.

The invention consists in creating, from a basic cellular material as defined above, one or more fluid-permeable zones and one or more fluid-impermeable zones. For this, the process of the invention consists in adding at least one second material to the cellular material. According to the invention, this second material is a single-component or multi-component material and has a liquid initial state. A change in the physicochemical properties of this second material, an evaporation of one of its constituents (for example a solvent) or a liquid/solid phase change of this second material in the cellular material then makes it possible to create a fluidic element having a heterogeneous structure of fluid-permeable zones and fluid-impermeable zones.

A liquid initial state is understood to mean a material that has a low enough degree of viscosity to, during the implementation of the fluidic element manufacturing process, penetrate into the cellular material or at least partially fill a cavity of the cellular material. The second material added could be naturally liquid at ambient temperature (between 10° C. and 35° C. for example) or be obtained in liquid form, for example by melting or any other process.

This second material, after solidification (obtained after waiting for a sufficient time) should also be elastic and deformable, in compression and in extension, in the same range as the first material, that is to say with a degree of elastic deformability of between 10% and 500% relative to its initial shape, preferably of between 50% and 200% relative to its initial shape. Furthermore, it should be noted that it should retain these mechanical characteristics after combination with the first material.

The second material will be for example:
- a polymer, such as an elastomer, or a polymer based on silicone, for example of PDMS (polydimethylsiloxane) or Ecoflex (registered trademark of Smooth-On) type, or based on urethane or on sulphide,
- more generally, a molten material that solidifies during the manufacturing process if this material has the mechanical characteristics described above, or
- any other material or set of materials making it possible to create said heterogeneous structure by generating impermeable zones by combining with the cellular material, while having the mechanical features of elastic deformability described above.

Preferably, the fluidic element obtained comprises at least one fluid-permeable zone 10, made of the basic cellular material, from which the second material defined above has been evacuated or excluded, the remainder of the fluidic element forming an impermeable zone 11 composed of the cellular material of which the cellular structure has been modified by the addition of the second material in order to render it impermeable to the fluid.

At the end of the manufacturing process, that is to say in particular after solidification of the second material, the fluidic element obtained will be deformable in compression and in extension with a degree of elastic deformability of between 10% and 500% relative to its initial shape, preferably of between 50% and 200% relative to its initial shape.

Figure 2:
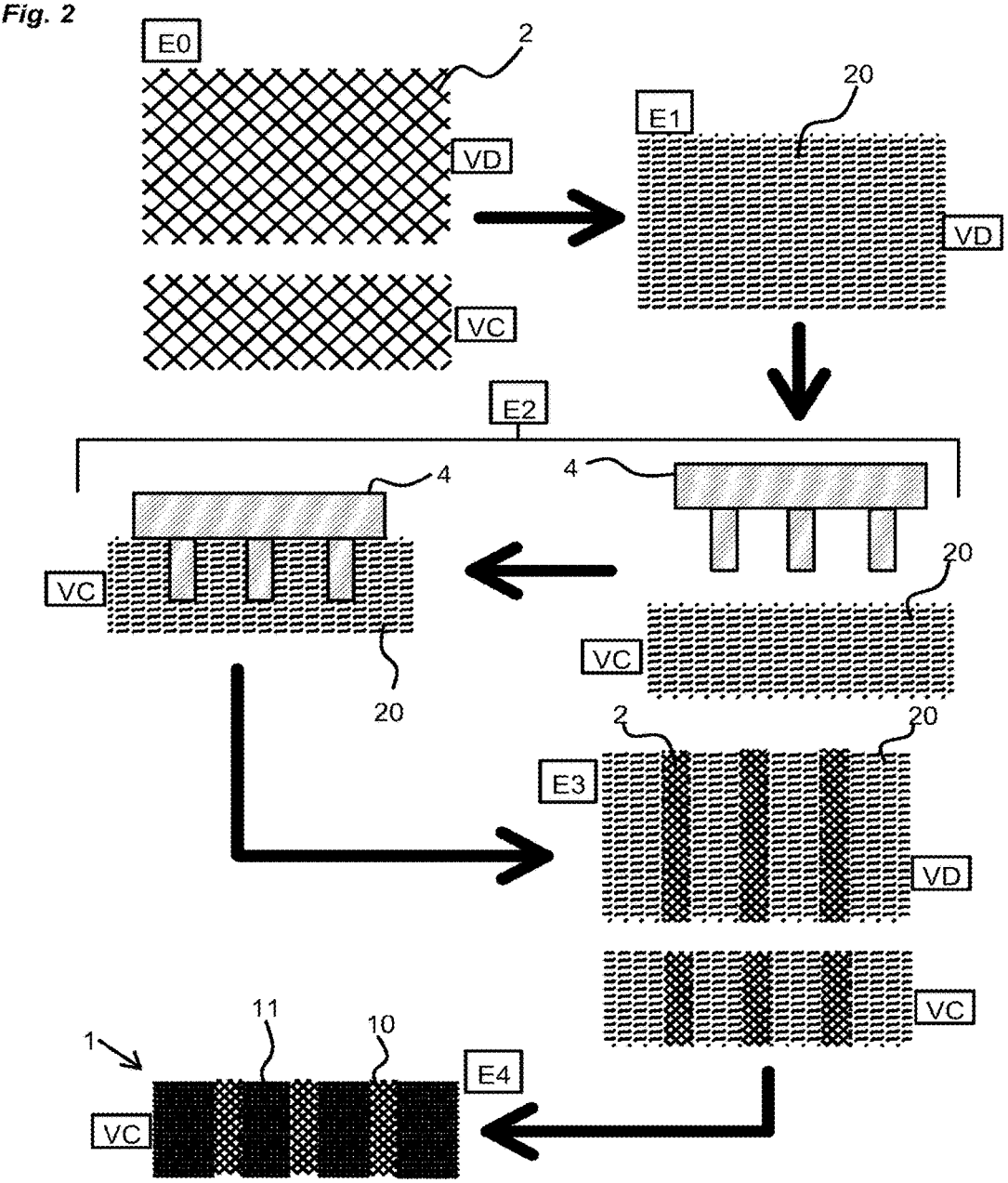
FIG. 2 schematically illustrates the various steps of the manufacturing process of the invention, according to a first embodiment variant.
Figure 3:
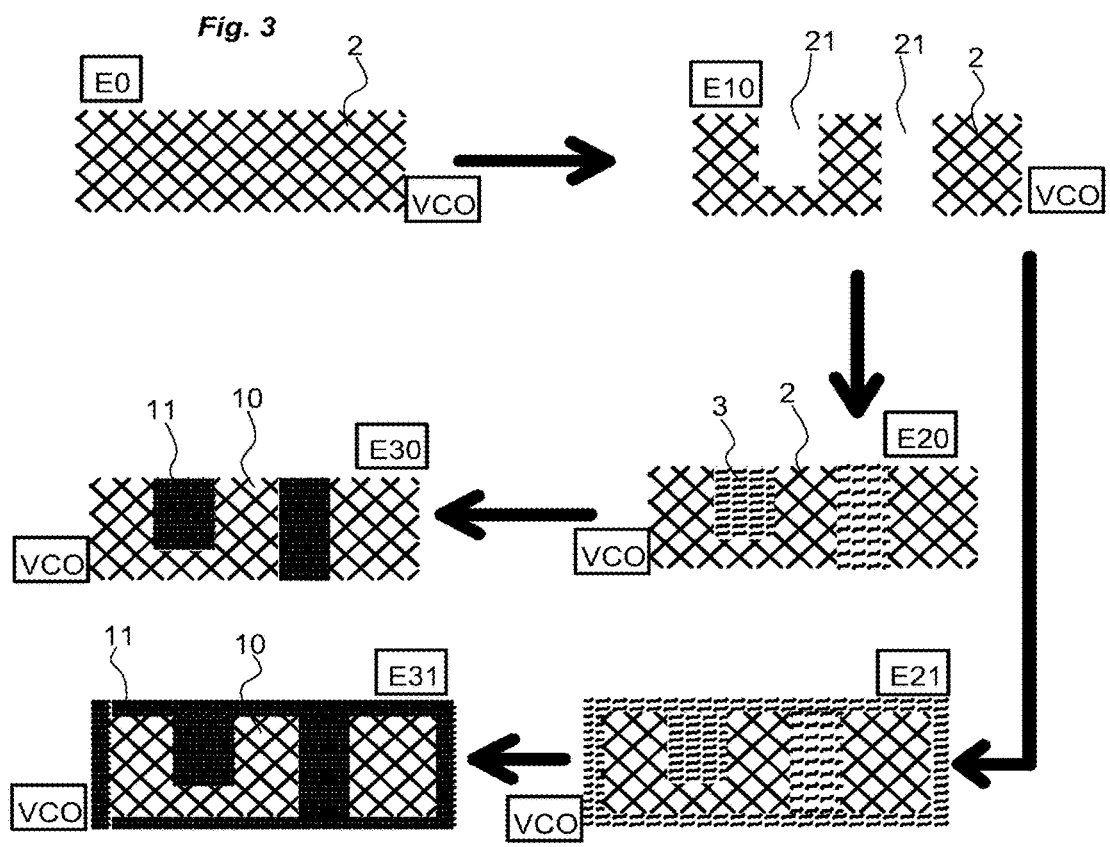
FIG. 3 schematically illustrates the various steps of the manufacturing process of the invention, according to a second embodiment variant.

According to the invention, the fluidic element could be obtained by various manufacturing processes. FIGS. 2 and 3 illustrate two different processes that make it possible to obtain a fluidic element in accordance with the invention. Of course, these are two examples and other processes could be imagined to obtain a fluidic element as described above, that is to say composed of a heterogeneous structure of permeable zones and of impermeable zones, produced from a cellular material and from a second material as described above.

In the process illustrated by FIG. 2, the cellular material is composed of an open-cell polyurethane foam 2 and the second material is formed from a liquid elastomer. The polyurethane foam 2 is initially cut to the desired shape, for example a rectangular parallelepiped (E0 in FIG. 2). The elastomer is prepared in an amount sufficient to completely soak the foam. For example, it will be a question of taking the volume of the polyurethane foam, adding 20% thereto and taking the mass of elastomer equivalent to the mass of water of this volume. The process thus comprises the following steps:

E1: The polyurethane foam 2 is soaked by the elastomer present in liquid form (for example at ambient temperature) so as to obtain a soaked foam 20. The soaking may be carried out for example by depositing the elastomer over all the faces of the volume formed by the foam and by making it penetrate by capillary action, by gravity, by compression, by vapour deposition, by electrochemistry or by any other suitable solution, into the volume formed by the foam. This soaking step should be carried out for the working time recommended by the manufacturer of the elastomer.

E2: The elastomer is evacuated from certain zones of the foam with a view to rendering these zones permeable. The remainder of the foam, which is occupied by the elastomer, will thus be intended to form impermeable zones 11. The evacuation of the elastomer is for example carried out by compression using a mould 4, the shape of which determines the shape of the permeable zones 10 to be obtained.

E3: The liquid elastomer initially present in the zones compressed by the mould 4 is evacuated from the compressed zone and cannot return to this zone. Restricting the return of the elastomer to an evacuated zone can be carried out in various ways:
- by varying the flow kinetics which are slower than the crosslinking time of the elastomer;
- by acting on the degree of porosity of the evacuated zone or of the zones surrounding the evacuated zone.

E4: After having evacuated the liquid elastomer from certain zones, the crosslinking of the elastomer present on the remainder of the foam makes it possible to create a fluidic element 1 that has a heterogeneous structure made of permeable zones 10 and of impermeable zones 11.

Furthermore, a supplementary step could be added in order to accelerate the curing of the liquid elastomer, by quenching, cooling, heating or by any other external action.

Supplementary and/or modifying elements may be introduced into the manufacturing process described above in connection with FIG. 2. These elements are the following:
- The evacuation of the elastomer during step E2 may be carried out by methods other than compression, for example by localized liquid and/or gaseous flushing or by localized suction;
- During the crosslinking of the liquid elastomer (between step E3 and step E4), the soaked foam 20 may be compressed and held in compression for the time of the crosslinking, so as to create patterns therein. The foam will thus retain the shape applied during the compression.
- The evacuation by compression carried out during step E2 may be carried out using a single mould 4 applied in compression or sequentially using several moulds applied in compression in a localized manner over the working time of the elastomer.
- The soaking step (E1) may be carried out by directly injecting the liquid elastomer into the foam 2 using a needle or any other equivalent solution.
- The evacuation may be replaced by a simple exclusion, that is to say that the process is carried out so that the soaking of the cellular material by the second material remains partial, that is to say by preventing the second material from occupying the zones of the cellular material that are intended to become permeable zones. It is a question for example of using a particular mask to target the zones of the cellular material to be soaked by the second material.

FIG. 3 illustrates an embodiment variant of the process of the invention. In this variant, the same constituents as for the process described above in connection with FIG. 1 are for example used.

E10: The foam 2 is cut with a particular shape so as to form through- or stopped-grooves 21.

E20: The liquid elastomer 3 is deposited on the foam 2 so as to become lodged in the grooves 21.

E30: After crosslinking, the elastomer thus forms impermeable walls at each groove occupied. A heterogeneous structure is obtained formed of permeable zones 10 occupied by the polyurethane foam 2 and of impermeable zones 11 formed by the walls thus created. The positioning and the shape of the grooves made define the parameters of the fluidic pathways through the foam.

E21 and E31: As a variant to steps E20 and E30, the foam 2 may be completely or partially coated by the liquid elastomer. In FIG. 3, the liquid elastomer thus covers all the faces of the foam, thus making it possible to isolate it from the outside.

The fluidic element obtained could have the same characteristics as those described above for the fluidic element obtained by the process described in connection with FIG. 2.

Other alternatives to the two process solutions described above may also be envisaged, for a similar result. These alternatives are the following:
- The second material used is a photosensitive polymer. The fluidic pathways are thus formed by exposing the polymer to a particular radiation, in a localized manner or through a mask.
- The second material is a heat-sensitive polymer. The fluidic pathways are thus formed by heating the polymer in a localized manner.

Figure 4:
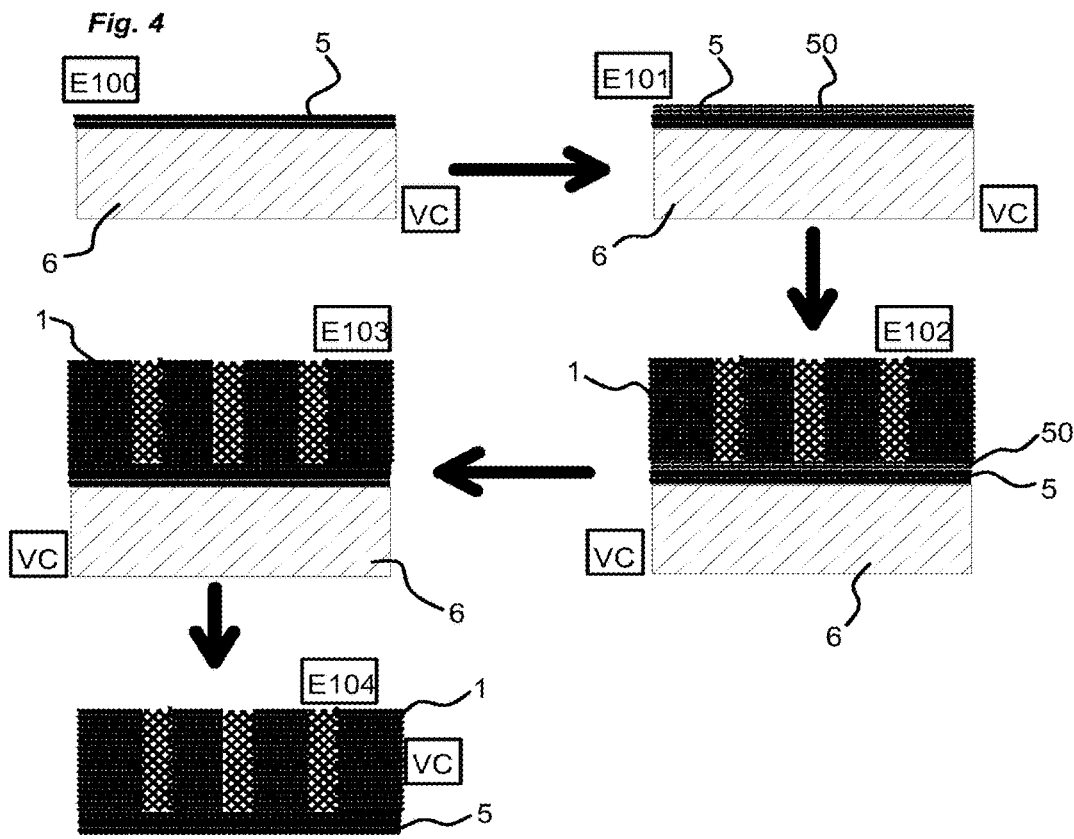
FIG. 4 schematically illustrates supplementary steps to be carried out in the manufacturing process of the invention, in order to seal the fluidic element on two opposite faces.

According to the invention, the process may also comprise supplementary steps that make it possible to seal the fluidic element formed, so as to better protect it. It is a question for example of applying a membrane to at least one face of the fluidic element. Preferably, it will be a question, for example, of applying membranes to two opposite faces of the fluidic element, for example its upper face and its lower face. The membrane will for example be composed of a stretchable or non-stretchable material of elastomer, adhesive or glue type. FIG. 4 illustrates an example of the implementation of the sealing of the fluidic element. It comprises the following steps:

E100: A liquid elastomer is deposited on a flat surface of a support 6, forming, after crosslinking, a membrane 5. This deposition will, for example, be carried out by spin coating.

E101: Once the membrane 5 has been formed, a layer 50 of non-crosslinked liquid elastomer is deposited on the membrane. During crosslinking, this layer will act as glue.

E102: The fluidic element 1 is deposited on the liquid elastomer layer 50. The crosslinking of this layer will make it possible to glue the fluidic element 1 to the membrane 5.

E103: The elastomer layer 50 has crosslinked, gluing the fluidic element 1 to the membrane 5.

E104: The fluidic element 1 sealed over one of its faces by the membrane 5 is then removed from the support.

The same sealing procedure may be carried out for the opposite face of the fluidic element 1. The sealing phases of the two opposite faces may be carried out one after the other or simultaneously in order to save time in the manufacture.

Figure 5:
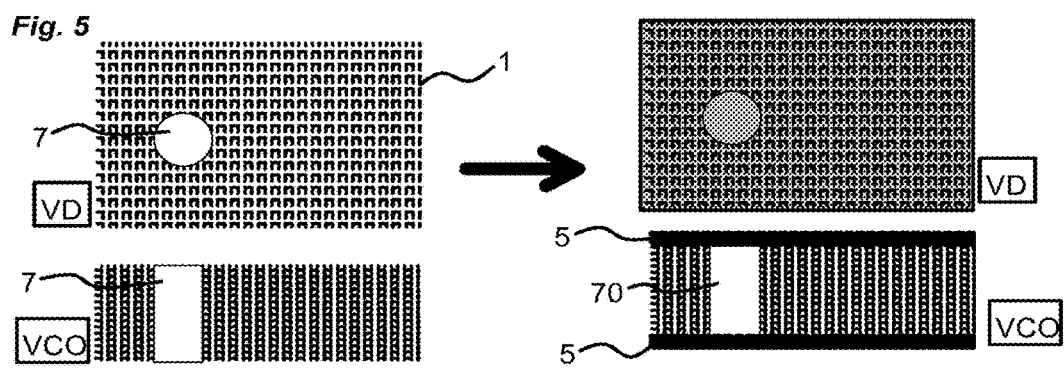
FIG. 5 represents an example of cutting the fluidic element, the element being sealed on its upper face and on its lower face.

With reference to FIG. 5, it is possible to cut the fluidic element 1 before the sealing thereof. It will be a question, for example, of creating an opening 7 through the element. Once the fluidic element 1 has been sealed on its upper face and on its lower face, this opening forms a cavity 70 empty of foam and isolated from the outside.

Figure 6A:
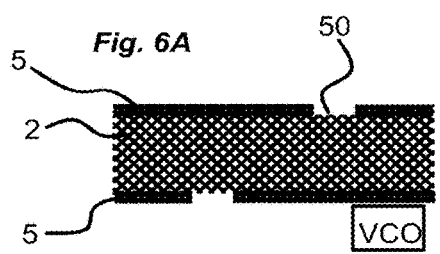
FIGS. 6A and 6B illustrate the principle of a partial sealing of the fluidic element.
Figure 6B:
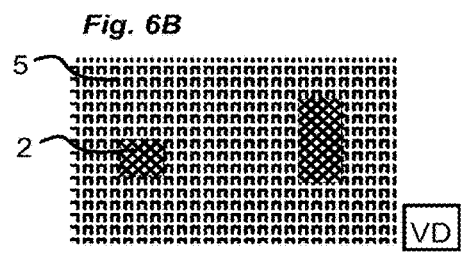

In an embodiment variant represented in FIGS. 6A and 6B, the sealing may be partial so that a membrane 5 does not cover the entire surface of the element. One or more openings 50 may thus be created through the membrane 5. It will be a question, for example, of placing a permeable zone 10 of the fluidic element 1 in contact with the outside. This will make it possible for example to capture compounds present on the outside, such as biochemical constituents, fluids of interest or solids that are for example in powder form.

The fluidic element 1 obtained thus has many advantages, including:

Since the cellular material used is preferably a foam, it is elastic, stretchable in compression and in extension and flexible. It may thus be handled and worked without risk of tears or ruptures within the elastic deformability limit of the fluidic element formed (see elastic deformability characteristics defined above).

It is easily foldable, which makes it possible to bring zones that are not connected by channels into contact. By folding the element, it is possible to connect two permeable zones, without having to make a channel.

It forms a structure which is porous in three dimensions, thus being able to form a large exchange or capture surface area with an external fluid.

Owing to the sealing, it may be easily isolated from the outside in order to avoid contaminations or the evaporation of the channelled fluid.

It can be manipulated by hand or using a machine.

Owing to these various advantages, the fluidic element 1 of the invention could be used for various applications, such as for example:

Filtration operation: the foam 2 of the permeable zone 10 may be compressed or decompressed. The degree of filtration may be adjusted by varying the porosity of the permeable zones, therefore for example on the cellular structure of the cellular material.

Peristaltic operation: suction/discharge of a liquid by compression/decompression of the element.

Valve operation: blocking the flow by local compression of a permeable zone 10 of the element.

Lab-on-chip operation: all the fluidic functions, that is to say for example flow, valve, filtration, are grouped together in a single device by suitably structuring the element.

The fluidic element may load a reactant, housed for example in a liquid or gaseous form or in the form of a powder in a capsule, which will be able to be released subsequently according to the envisaged application.

Figure 7A:
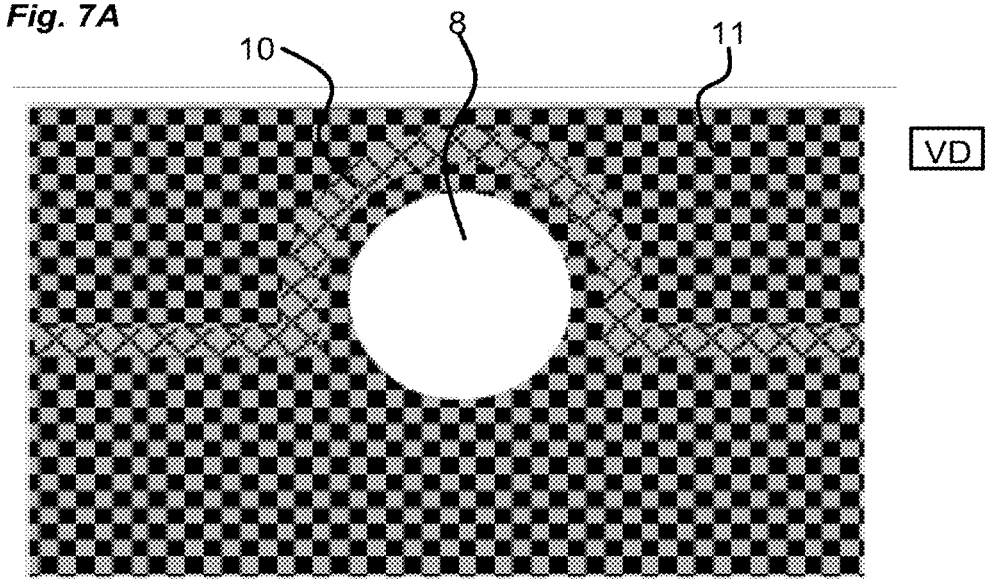
FIGS. 7A and 7B illustrate an application of a fluidic element in accordance with the invention in a peristaltic pump solution.
Figure 7B:
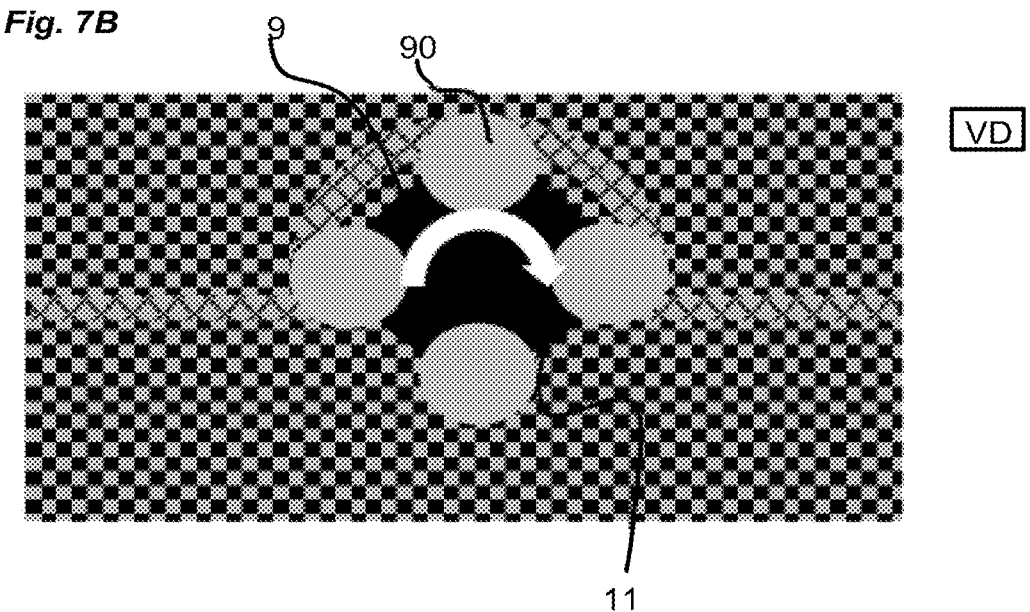

FIGS. 7A and 7B illustrate an application of a fluidic element in accordance with the invention in a peristaltic pump solution.

For this application, the fluidic element has for example the structure represented in FIG. 7A in which the fluidic element comprises a permeable zone 10 formed of a fluidic channel, the remainder of the fluidic element being an impermeable zone 11. Seen from the top, the fluidic channel is omega-shaped. The fluidic element also comprises a through-opening 8 made in the recess formed by the omega, along an axis transverse to the passage of the fluid in the channel.

The fluidic element thus formed is joined to a rotatable head 9 to form a peristaltic pumping solution. The rotatable head 9 comprises several rollers 90 over its circumference. It is actuated in rotation about an axis of rotation substantially coincident with the axis of said opening 8.

In operation, the rotation of the head 9 drives the rollers 90 which are then capable of compressing the fluidic channel. The squashed channel then acts as a deformable tube present in a conventional peristaltic pump, by displacing a volume of fluid between each passage of the rollers. The elasticity of the fluidic channel enables a reversibility of the deformation. The fluidic flow rate varies from a few microliters per minute to several milliliters per minute, depending on the speed of rotation applied to the head.

The invention claimed is:

1. A process for manufacturing a fluidic element, said process comprising:
    forming at least one fluid-permeable zone and one fluid-impermeable zone in a three-dimensional cellular material by addition of at least one second material having a liquid initial state;
    soaking of the cellular material by the second material present in the liquid initial state; and
    evacuating the second material present in its liquid initial state from at least one zone of the cellular material, in order to render said permeable zone,
    wherein the cellular material has a degree of elastic deformability in compression and in extension of between 10% and 500% relative to an initial shape.

2. The process according to claim 1, wherein the evacuating step is carried out by compression of the soaked cellular material in said zone.

3. The process according to claim 1, wherein the soaking step is carried out by compression in order to make the second material penetrate into the cellular material.

4. The process according to claim 1, further comprising a step of creating at least one pattern in said soaked cellular material.

5. The process according to claim 1, further comprising the following steps:
    creating at least one cavity in the cellular material,
    inserting the second material in said cavity in order to form an impermeable zone by solidification of the second material.

6. The process according to claim 1, wherein said second material is a polymer.

7. The process according to claim 6, wherein said second polymer material is an elastomer.

8. The process according to claim 6, wherein said second polymer material is based on silicone.

9. The process according to claim 1, wherein the cellular material comprises open cells.

10. The process according to claim 9, wherein the cellular material is a polyurethane foam.

11. The process according to claim 9, wherein the cellular material is a silicone foam.

12. The process according to claim 1, further comprising a step of sealing at least one portion of the surface of the cellular material, by application of a membrane impermeable to the liquid on said portion of the surface of the cellular material.

* * * * *